Dec. 29, 1931.   P. L. McKEE   1,838,184
GREENHOUSE VENTILATOR
Original Filed Oct. 3, 1928   2 Sheets-Sheet 1
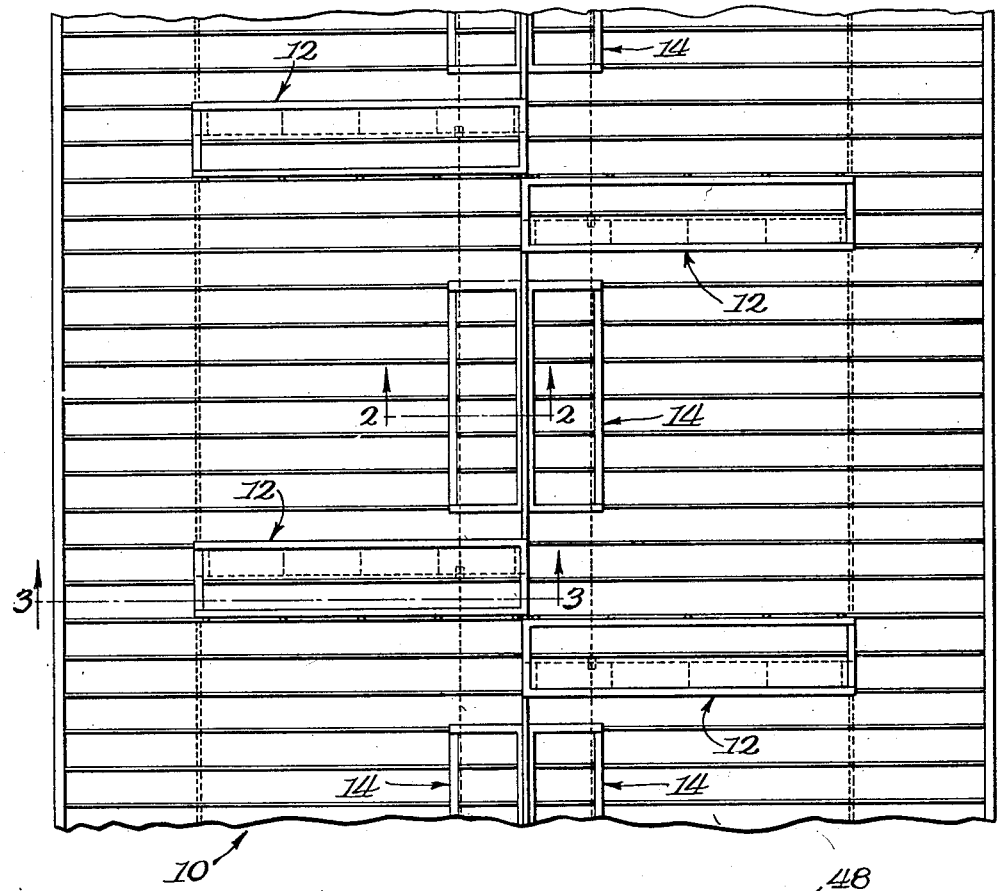
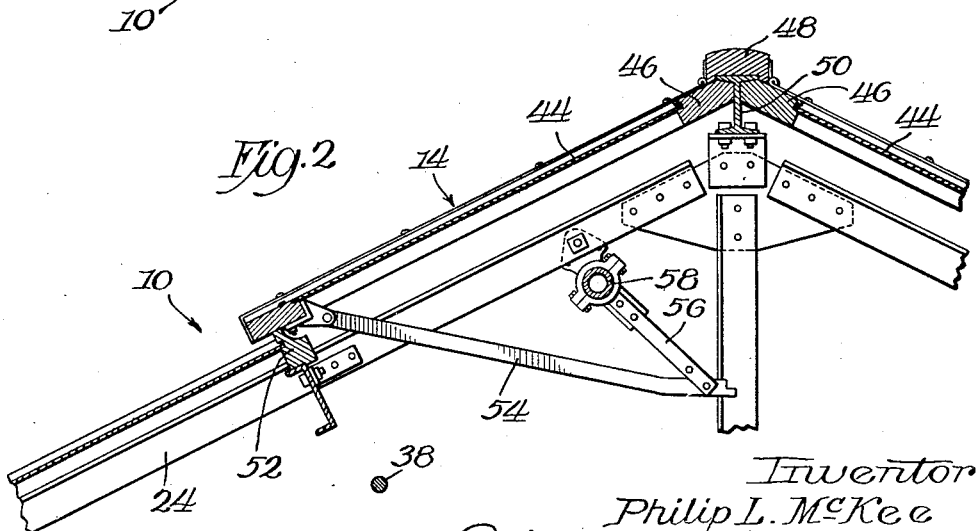
Inventor
Philip L. McKee
By Cheever + Cox   Attys Dec. 29, 1931. P. L. McKEE 1,838,184
GREENHOUSE VENTILATOR
Original Filed Oct. 3, 1928    2 Sheets-Sheet 2
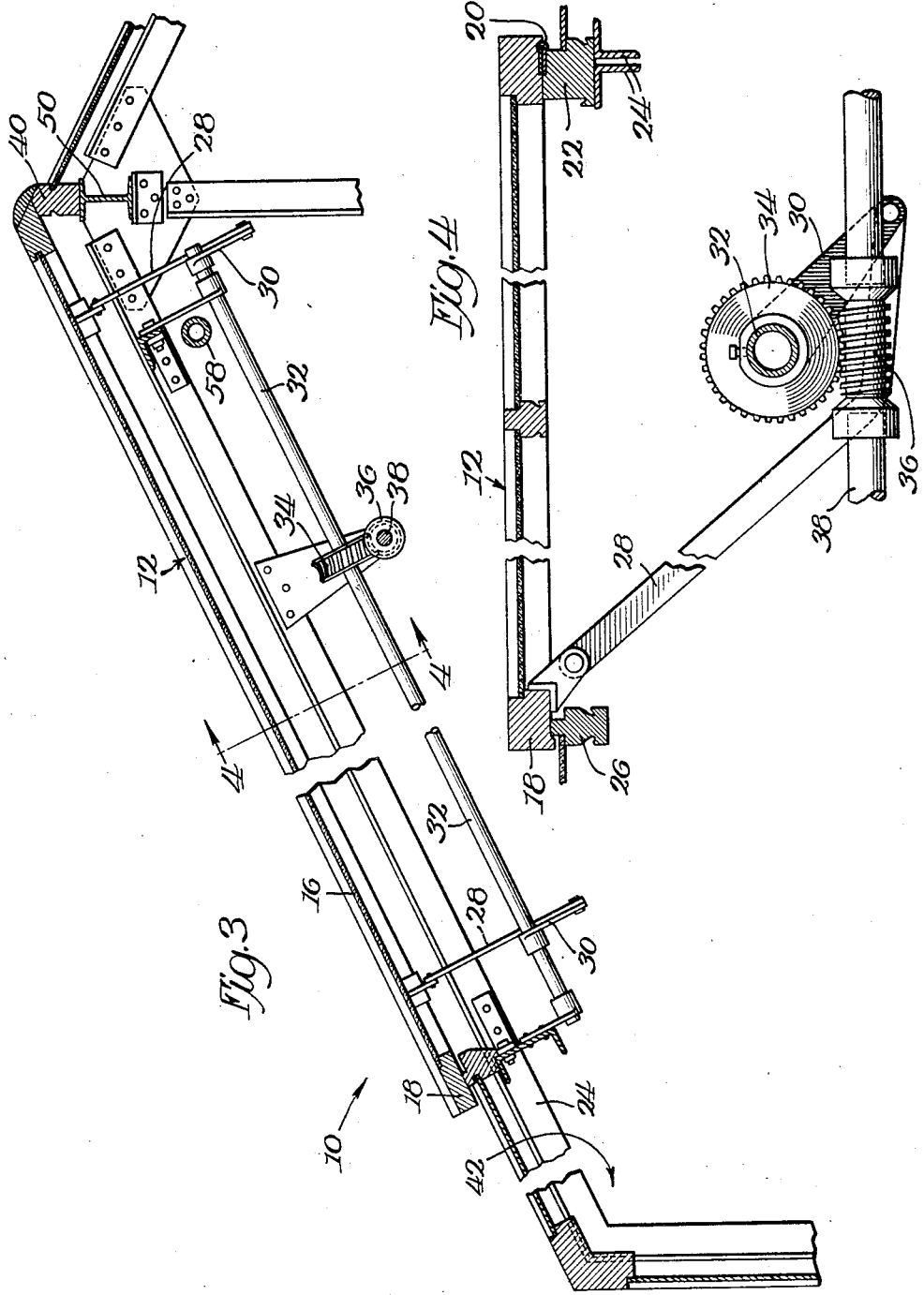
Inventor
Philip L. McKee
By Cheever + Cox attys Patented Dec. 29, 1931

1,838,184

UNITED STATES PATENT OFFICE

PHILIP L. McKEE, OF PANA, ILLINOIS

GREENHOUSE VENTILATOR

Application filed October 3, 1928, Serial No. 310,104. Renewed May 13, 1931.

My invention relates to greenhouse constructions and more particularly to an improved ventilator arrangement for greenhouses.

Experience has shown that one of the spaces in a greenhouse which it is most difficult to properly ventilate is the space which lies adjacent the eaves of the greenhouse or, in other words, the space within the corner presented at the juncture of the side wall and the inclined roof.

One of the primary objects of my present invention is to alleviate the aforementioned conditions within a greenhouse and to this end I propose to employ a novel arrangement of hinged ventilators on the inclined roof.

More specifically, it is an object of my invention to so construct the greenhouse roof that it will be possible to open portions of the roof to the atmosphere by means of ventilators which extend transversely thereof a substantial distance downwardly from the roof ridge, whereby the space confined in the above mentioned corner or eave portions of the greenhouse will be effectively ventilated.

A still further object of my invention is to arrange the above mentioned transversely extending ventilators on opposite sides of the roof ridge so that some of the ventilators may be swung open in one direction and others in the opposite direction, this construction serving to render possible the effective ventilation of the greenhouse regardless of the inclemency of the weather, such as the presence of wind and rain.

A still further object of my invention is to expedite the proper ventilation in greenhouses by providing the above mentioned transversely extending ventilators in combination with ventilators extending longitudinally of the upper portion of the roof and hinged at the ridge thereof, thereby insuring proper ventilation in the upper space of the greenhouse as well as in the lower space or area adjacent the eaves.

These and other objects will be more apparent from the following detailed description when considered in connection with the accompanying drawings, wherein—

Figure 1 is a fragmentary plan view of a greenhouse roof having a ventilator construction arranged in accordance with the teachings of my invention;

Figure 2 is an enlarged fragmentary transverse sectional view taken substantially along the line 2—2 of Figure 1;

Figure 3 is a similar transverse sectional view taken along the line 3—3 of Figure 1; and Figure 4 is a sectional view taken transversely of the ventilator window disclosed in Figure 3, said section being taken along the line 4—4 of Figure 3.

Referring now to the drawings more in detail wherein I have employed like numerals to designate similar parts throughout the various figures, it will be observed that for purposes of illustrating one embodiment of my invention I have disclosed, in Figure 1, a fragmentary plan view of a greenhouse indicated generally by the numeral 10 which is equipped with ventilators 12 extending transversely of the greenhouse roof and ventilators 14 extending longitudinally thereof. The transversely extending ventilators 12 comprise a transparent window pane 16, Figure 3, supported by a window sash 18. This window sash 18 is provided with a hinge 20, Figure 4, one leaf of said hinge being secured to the window sash and the other to a suitable inclined roof beam 22 which is supported by angle irons 24. These hinges 20 are spaced along one edge of the window sash and the free end of said sash is adapted to rest upon an inclined roof beam 26 when said sash is closed, as shown in Figure 4. Any convenient means may be employed for effecting the opening and closing of the ventilator 12 such as the device shown in Figure 4, which includes a link 28 interposed between the free edge of the sash 18 and the outer extremity of a lever arm 30. This lever arm 30 is carried by a shaft 32 which supports a worm-gear 34. This worm-gear 34 meshes with a companion worm 36 carried by a shaft 38 extending longitudinally of the greenhouse and it will be apparent that when rotation is imparted to the shaft 38 in the proper direction, the opening of the ventilator 12 will be effected.

It is to be noted that the ventilator 12 extends downwardly a substantial distance from a ridge pole 40 along the greenhouse roof. In other words, the lower extremity of the ventilator 12 terminates at a point relatively close to the greenhouse eave, as compared with other types of greenhouse ventilators which have heretofore been employed. In this manner I am able to very effectively ventilate the space within the greenhouse which I have designated by the numeral 42, Figure 3. Heretofore it has been found very difficult to properly ventilate this space or area 42 which is located at the juncture of the greenhouse roof and vertical side wall and my invention provides a construction which serves to effect the proper ventilation of this area. The ventilator 12 may be so constructed as to extend transversely of the greenhouse roof a distance which will provide for the proper ventilation of the space just referred to, and as shown in Figure 1 of the drawings, I have found it preferable in certain instances to extend the ventilators 12 practically two-thirds of the distance across the inclined roof.

It will also be seen that both of the inclined roof areas are provided with the above mentioned ventilators 12 and 14. In the particular embodiment disclosed in the drawings I have shown the ventilators on one roof as being tiltable in a direction opposite to the direction in which the ventilators on the opposite roof may be tilted. Thus, if a heavy rain and wind is beating downwardly and across the greenhouse roof, the ventilators which open against the wind, may be opened and the other ventilators may be closed. In other words, by having a plurality of ventilators 12 positioned along the inclined roof areas and tiltable in opposite directions, correct ventilating conditions may be established within the greenhouse regardless of the inclemency of the weather.

The ventilators 14 comprise a window pane 44 and a sash 46 and the upper portion of this sash 46 is hinged to a ridge cap 48. This ridge cap is mounted upon a ridge I-beam 50. The specific arrangement of the ridge cap 48 and the I-beam 50 is disclaimed as a part of the present invention and is disclosed in my co-pending application Serial No. 240,988, filed December 19, 1927. The free extremities of the sashes 46 rest upon a longitudinally extending cross beam 52, as clearly shown in Figure 2. The ventilators 14 are adapted to be swung open through the agency of a link 54 interposed between the upper end of said ventilator and an arm 56 supported by a longitudinally extending shaft 58.

From the foregoing it will be understood that in addition to the ventilation which is effected through the opening of the ventilators 12, proper ventilation in the upper portion of the greenhouse is obtained by means of the ventilators 14. Both of these ventilators 12 and 14 co-operate to ventilate a greenhouse with a degree of effectiveness which has heretofore been unattained with the use of known types of ventilators. While the lower portions of the transversely extending ventilators 12 serve to properly ventilate the spaces 42 located at the juncture of the greenhouse roof and side wall, the upper portions thereof co-operate with the ventilators 14 to expedite the ventilation of the remaining space within the greenhouse.

Having thus described my invention, what I claim as new and desire to secure by Letters Patent is:

1. In a greenhouse roof construction, roof beams inclined downwardly from a ridge beam, a plurality of elongated ventilator windows extending transversely of the inclined roof a substantial distance, and hinges on said window ventilators having their axes extending transversely of the roof, whereby said ventilators may be opened so as to positively effect proper ventilation in the space within the greenhouse at the juncture of the roof and side wall thereof, and other ventilator windows extending longitudinally of the inclined roof, and hinges on said longitudinal windows and having their axes extending longitudinally of said roof, whereby said ventilators may be opened to effect proper ventilation in the space within the greenhouse at the apex of the roof.

2. In a greenhouse roof construction, roof beams inclined downwardly from each side of a ridge beam, a pair of ventilators hinged longitudinally of the ridge beam and opening in opposite directions, and other ventilators extending and hinging transversely of said ridge beam and opening in an opposite direction.

3. In a greenhouse roof construction, roof beams inclined downwardly from each side of a roof beam, and a plurality of alternate longitudinal and transverse ventilators arranged on each side of said roof beam, the ventilators on one side of said beam opening in a direction opposite to the corresponding ventilators on the other side of said beam.

4. In a greenhouse having side walls and a roof therefor, and a plurality of ventilators arranged in said roof, some of said ventilators being arranged in close proximity to said side walls to provide an air circulation in the area of the juncture of the side walls and the roof, other of said ventilators located at an angle to the first named ventilators and opening in opposite directions, whereby there will be at least one ventilator opening in each of the four cardinal directions.

In witness whereof, I have hereunto subscribed my name.

PHILIP L. McKEE.